Nov. 14, 1939.  L. S. COOPER  2,179,494
SMELL ELIMINATION IN RUBBER PRODUCTS
Filed Jan. 2, 1936
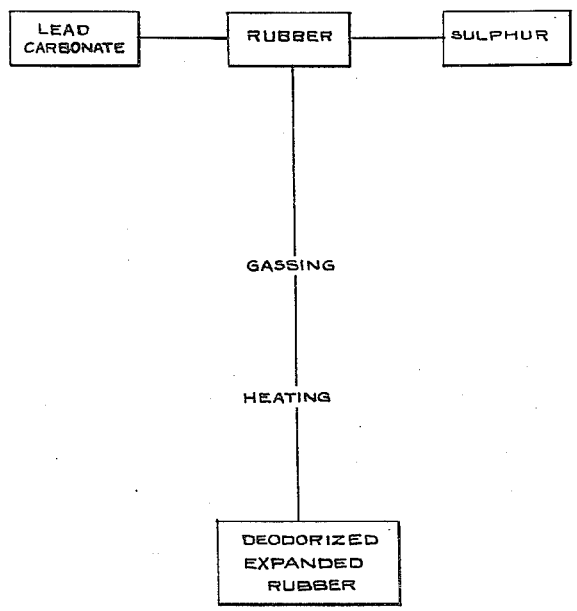
INVENTOR.
Lester S. Cooper
BY
Ostrolenk, Greene & Marser
ATTORNEYS Patented Nov. 14, 1939

2,179,494

UNITED STATES PATENT OFFICE 2,179,494

SMELL ELIMINATION IN RUBBER PRODUCTS

Lester S. Cooper, Bedford, Va., assignor to Rubatex Products, Inc., New York, N. Y., a corporation of Delaware Application January 2, 1936, Serial No. 57,309

7 Claims. (Cl. 18—53)

This invention relates to the elimination of objectionable odors from vulcanized rubber products.

In the manufacture of gas expanded rubber boards, the rubber dough must be vulcanized and as is known in the art, sulphur is used therefor. Compounds of sulphur and hydrogen are generated during the final cure or expansion process forming a gas that permeates to the entrapped gas cells. The elimination of hydrogen sulphide and other unpleasant generated gases from gas expanded rubber products has heretofore been extremely difficult or impractical. Hydrogen sulphide is entrapped in the tiny individual gas cells of the gas expanded rubber product. When such a product or board is cut, objectionable odors immediately result due to the hydrogen sulphide released by the ruptured cells.

The problem of odor elimination in the manufacture of conventional hard rubber exists, but to a lesser degree than for expanded rubber products.

I have discovered that it is possible to add certain substances to the rubber dough to form a chemical reaction which eliminates the hydrogen sulphide and accordingly removes the chief factor in odor production. The added zinc dust reacts with the hydrogen sulphide to precipitate zinc sulphide. The use of white lead which is chiefly lead carbonate containing some lead hydroxide reacts with the hydrogen sulphide to precipitate lead sulphide. A further advantage of using commercial white lead or lead carbonate is that the resultant gas expanded rubber product is of a true black color throughout due to the lead sulphide precipitation.

Heretofore it has been difficult to produce hard, gas expanded rubber having a true black color. By utilizing other ingredients than zinc or white lead for removing the hydrogen sulphide, precipitates of different colors such as orange, yellow and white are produced, self-coloring the expanded rubber product.

It is accordingly an object of my invention to provide a novel, odorless rubber product.

Another object of my invention is to provide a novel gas expanded rubber product having no objectionable odors.

Still another object of my invention is to provide a novel process for removing hydrogen sulphide from vulcanized rubber products.

A further object of my invention is to provide a novel gas expanded rubber product having a true black color throughout.

A still further object of my invention is to provide a novel process for manufacturing gas expanded rubber of different colors.

These and other objects of my invention will become apparent in the following description of a preferred composition manufactured in accordance with my invention.

The drawing shows a schematic representation of the steps of the process of the present invention.

More specifically the figure of the drawing shows the addition of lead carbonate and sulphur, which are the major ingredients of the present invention, to the rubber, whereupon all the ingredients are properly mixed together. After proper shaping the mixture is gassed and heated. The heating, particularly that of the final vulcanization, causes the formation of hydrogen sulphide, whereupon the lead carbonate reacts with the hydrogen sulphide to form compounds of little odor.

The ingredients for manufacturing gas expanded rubber hard boards are in proportion by weight:

| | |
|---|---|
| Smoked rubber sheets | 100 |
| Sulphur | 50 |
| Diphenyl guanidine | 1.5 |
| Mercaptobenzothiozole | .0625 |
| Lime | 100 |
| White lead | 35 |

The ingredients are prepared and the rubber product is manufactured in a manner similar to that described in the application Serial No. 717,550 of Roberts, Scott and Peel, filed Mar. 27, 1934.

The addition of the white lead is the basis of the present invention which produces a gassed rubber product having practically no hydrogen sulphide odor as well as producing a product which is definitely black throughout as will be hereinafter described in detail. The manufacture of the gas expanded rubber boards may be carried out in any suitable manner already established in the art.

The sheets of rubber are masticated and the ingredients are mixed on the mill until they are completely dispersed to produce a rubber dough. The dough is then calendered or tubed dependent upon the shape of the article to be made. After eighteen hours of rest, the dough is placed in an autoclave. As is well known in the art, the autoclave is a high pressure gassing vessel containing an internal piping structure for steam heating or water cooling of its contents. After the air has been removed, inert gas at a pressure of about 3000 pounds at room temperature is applied within the chamber and one pound per square inch pressure of steam is admitted in the heating coils for one and a half hours. The apparatus is then permitted to cool down for one hour (no water on) and then is cooled for two and a half hours with circulating water flowing through the autoclave pipe structure. The gas pressure is then withdrawn from the autoclave and the gassed dough is removed. The gas at a high pressure is adsorbed by the rubber dough and the heating in the autoclave semi-cures the dough so that upon its removal from the autoclave, the gas is retained in the dough in individual cells.

The semi-cured rubber dough is then placed in a suitable mold which in turn is placed into a platen press. The press maintains sufficient pressure on the mold to counteract the expansive forces generated by the expanding rubber within it so that it may conform to the desired molding or shape, for example, a slab or board construction. The platens are steam heated so that the dough within the mold may be finally cured.

Steam pressure at ninety pounds per square inch is admitted to the steam platens of the press for one hour to completely cure the rubber product herein described. The hardened slabs of the gas expanded rubber are removed from the molds when they are cool.

The rubber dough is compounded so that when it is placed in the autoclave under high pressure of an inert gas, it will be partially cured sufficiently to retain a large amount of the adsorbed or occluded gas after the gas pressure is released and yet be sufficiently uncured to possess expandability and mobility for properly filling the mold during the final curing stage. The process is based upon the formation of a myriad of independent gas cells within the dough by the inert gas at high pressure. Each minute cell expands in size according to the contained gas pressure and according to the tensile strength and percentage elongation of the dough. During the heating of the final curing stage, the entrapped gas of the individual cells exerts great internal pressure, further expanding the cells. At least twenty-five per cent increase in volume occurs during the final curing stage and the quantity of dough placed in the mold should permit proper expansion thereof. Over-expansion should be avoided to prevent rupturing of the gas cells during the final expansion so as to produce a product having an individual gas cellular structure.

The sulphur necessary for vulcanization reacts with the ingredients during the curing stage to generate compounds of sulphur and hydrogen, particularly hydrogen sulphide. The removal of the hydrogen sulphide is the basis of the present invention and it is performed in the preferred illustration by the white lead. White lead is precipitated by the hydrogen sulphide gas. Lead carbonate which is a white salt of the white lead reacts with the hydrogen sulphide as follows:—

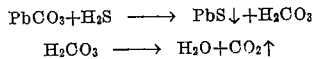

The lead precipitates as a black lead sulphide and the carbonic acid splits up into water and carbon dioxide gas.

White lead carbonate generally contains an appreciable percentage of lead hydroxide which reacts with H₂S as follows:

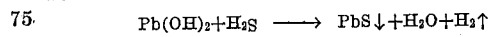

A sufficient quantity of lead salt is included to react with all the hydrogen sulphide generated in the rubber product. The resultant hard expanded rubber product is accordingly odorless since practically no hydrogen sulphide gas remains in the completed product. The lead sulphide precipitate is black and being homogeneously mixed through the rubber, imparts a truly black color to it.

White lead ingredients for the rubber product accordingly produces an odorless self-coloring material. Other metallic salts may be used to react with the hydrogen sulphide to produce precipitates of different colors. For example, when zinc salts are used, the color of the resultant rubber product is white; when cadmium salts are used, it is yellow; when antimony salts are used, it is orange. The color imparted to the rubber product is the color of the precipitated sulphide.

Although I have described the use of metallic salts to precipitate the hydrogen sulphide, I have successfully used metallic zinc dust for this purpose. Accordingly, the use of a metallic dust is feasible for precipitating the hydrogen sulphide during the manufacture of rubber products.

The odorless hard rubber product according to my invention may be used in the manufacture of expanded hard rubber tiling or any other hard rubber product requiring homogeneous pigmentation rather than superficial coloring with organic dyes. The color imparted to such a product depends upon the particular sulphide precipitate employed.

Although I have described in detail the specific constituents of a preferred form of my product and the exact steps of one process for forming the same, it will be obvious that modifications thereof still coming within the scope of the invention may be made to both the constituent parts and in the process. I do not intend to be limited for example by the particular metallic salt used to react with the hydrogen sulphide or by the use of metallic dust in place of the metallic salt or by its application to the removal of hydrogen sulphide alone or to gas expanded rubber but only by the appended claims.

I claim:

1. The process of producing a deodorized gas expanded sealed cell rubber structure which comprises mixing sulphur with rubber; thoroughly blending therewith a deodorizing material adapted to react with the sulphur and the hydrogen sulphide gas that is subsequently formed during the expansion of the rubber mix; regulating the consistency of the rubber mix so that it will entrap gas without permitting said gas to escape from the rubber mix; gassing the rubber mix; subjecting the gassed rubber mix to heat to expand it at least 600 per cent; reacting the deodorizing material with the sulphur and hydrogen sulphide gas within the rubber mix to form sulphur compounds of little odor; and setting the gas expanded rubber in a vulcanized condition.

2. The process of producing a deodorized gas expanded sealed cell rubber structure which comprises mixing sulphur with rubber; thoroughly blending therewith a deodorizing salt adapted to react with the sulphur and the hydrogen sulphide gas that is subsequently formed during the expansion of the rubber mix; regulating the consistency of the rubber mix so that it will entrap gas without permitting said gas to escape from the rubber mix; gassing the rubber mix; subjecting the gassed rubber mix to heat to expand it at least 600 per cent; reacting the deodorizing salt with the sulphur and hydrogen sulphide gas within the rubber mix to form sulphur compounds of little odor; and setting the gas expanded rubber in a vulcanized condition.

3. The process of producing a deodorized gas expanded sealed cell rubber structure which comprises mixing sulphur with rubber; thoroughly blending therewith a deodorizing metal salt adapted to react with the sulphur and the hydrogen sulphide gas that is susequently formed during the expansion of the rubber mix; regulating the consistency of the rubber mix so that it will entrap gas without permitting said gas to escape from the rubber mix; gassing the rubber mix; subjecting the gassed rubber mix to heat to expand it at least 600 per cent; reacting the deodorizing metal salt with the sulphur and hydrogen sulphide gas within the rubber mix to form sulphur compounds of little odor; and setting the gas expanded rubber in a vulcanized condition.

4. The process of producing a deodorized gas expanded sealed cell rubber structure which comprises mixing sulphur with rubber; thoroughly blending therewith a deodorizing lead salt adapted to react with the sulphur and the hydrogen sulphide gas that is subsequently formed during the expansion of the rubber mix; regulating the consistency of the rubber mix so that it will entrap gas without permitting said gas to escape from the rubber mix; gassing the rubber mix; subjecting the gassed rubber mix to heat to expand it at least 600 per cent; reacting the deodorizing lead salt with the sulphur and hydrogen sulphide gas within the rubber mix to form sulphur compounds of little odor; and setting the gas expanded rubber in a vulcanized condition.

5. The process of producing a deodorized gas expanded sealed cell rubber structure which comprises mixing sulphur with rubber; thoroughly blending therewith basic lead carbonate adapted to react with the sulphur and the hydrogen sulphide gas that is subsequently formed during the expansion of the rubber mix; regulating the consistency of the rubber mix so that it will entrap gas without permitting said gas to escape from the rubber mix; gassing the rubber mix; subjecting the gassed rubber mix to heat to expand it at least 600 per cent; reacting the basic lead carbonate with the sulphur and hydrogen sulphide gas within the rubber mix to form sulphur compounds of little odor; and setting the gas expanded rubber in a vulcanized condition.

6. The process of producing a deodorized gas expanded sealed cell rubber structure which comprises mixing sulphur with rubber; thoroughly blending therewith a deodorizing metal salt adapted to react with the sulphur and the hydrogen sulphide gas that is subsequently formed during the expansion and vulcanization of the rubber mix; gassing the rubber mix; expanding the gassed rubber to form a sealed cell gas expanded rubber structure; reacting the deodorizing metal salt with the sulphur and hydrogen sulphide gas within the rubber mix to form sulphur compounds of little odor; and setting the gas expanded rubber in a vulcanized condition.

7. The process of producing a deodorized gas expanded sealed cell rubber structure which comprises mixing sulphur with rubber; thoroughly blending therewith a deodorizing lead salt adapted to react with the sulphur and the hydrogen sulphide gas that is subsequently formed during the expansion and vulcanization of the rubber mix; gassing the rubber mix; expanding the gassed rubber to form a sealed cell gas expanded rubber structure; reacting the deodorizing lead salt with the sulphur and hydrogen sulphide gas within the rubber mix to form sulphur compounds of little odor; and setting the gas expanded rubber in a vulcanized condition.

LESTER S. COOPER.